Patented June 17, 1941

2,245,593

UNITED STATES PATENT OFFICE 2,245,593

HALOGENO-CARBOXYLIC AMIDES

Morris B. Katzman, Chicago, Ill., assignor to The Emulsol Corporation, Chicago, Ill., a corporation of Illinois No Drawing. Application December 16, 1939, Serial No. 309,575

20 Claims. (Cl. 260—404)

This invention relates to a new class of chemical substances and, more in particular, to a new class of chemical compounds which are particularly adapted for use as intermediates in the preparation of assistants for the textile and related industries, as detergents, dyeing assistants, wetting, penetrating, lathering, foaming, froth flotation, anti-spattering agents, and the like. In some cases, and to some extent, the intermediates, in themselves, possess some properties which adapt them, as such, for use for the purposes indicated above.

At least most of the novel compounds fall within the scope of the general formula:

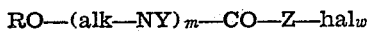

wherein R is an organic radical containing at least four carbon atoms, alk stands for hydrocarbon, for example, alkylene or arylene such as ethylene or phenylene, Y is hydrogen, alkyl, cycloalkyl, alkoxyl, aralkyl, aryl, or alkylol, Z is preferably a hydrocarbon residue, containing preferably less than six carbon atoms, hal is halogen, and $m$ and $w$ are whole numbers, preferably from one to four.

A more limited aspect of the compounds of the invention may be represented by the general formula

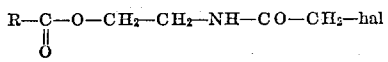

wherein R is a hydrocarbon radical or substituted hydrocarbon radical containing at least seven and preferably from eleven to seventeen carbon atoms, and hal is halogen.

The radical R in the above formula may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Z and alk, likewise, may contain substituent groups such as amino, hydroxy, halogen, sulphate, sulphonic, phosphate, carboxyl, nitrile, and the like, and the sequence of carbon atoms therein may be interrupted by O, S, C=O, NH, NR, where R is alkyl, and the like.

In order that the nature of the invention may become more apparent, there are listed hereinbelow representative compounds which fall within the scope of the invention. It will be understood that such compounds may be utilized in the pure or impure state or in the form of reaction mixtures containing predominant or substantial proportions of said compounds or in the form of mixtures of any two or more of said compounds. It will further be appreciated that the higher molecular weight acyl groups, the hydroxy amine groups and the halogeno-carboxylic acid groups which enter into the formation of the various compounds may be interchanged without departing from the spirit of the invention:

(1)

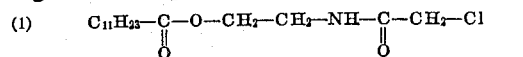

(2)

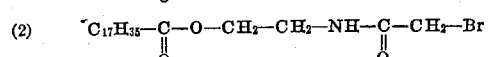

(3)

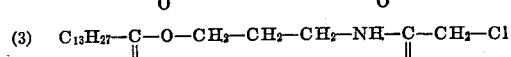

(4)

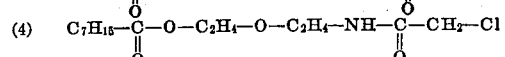

(5)

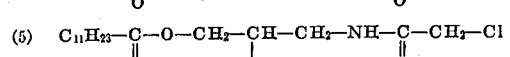

(6)

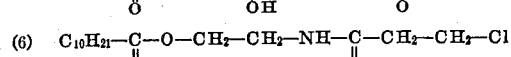

(7)

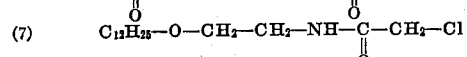

(8)

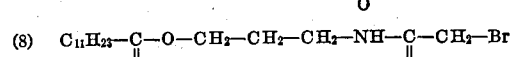

(9)

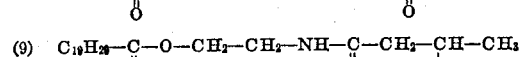

(Abietic acid)

(10)

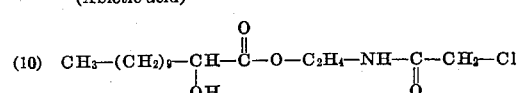

(11)

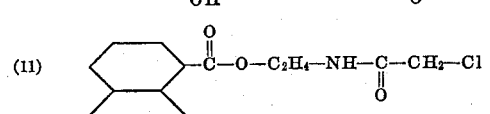

(12)

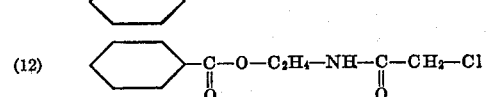

(13)

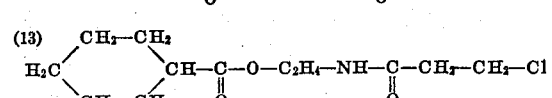

(14)

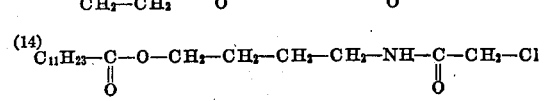

(15) 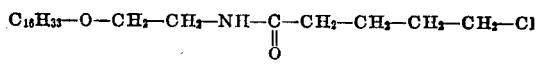

(16) 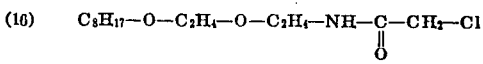

(17) 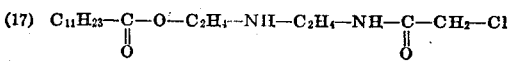

(18) 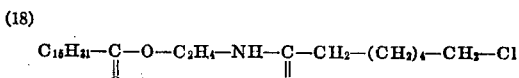

(19) 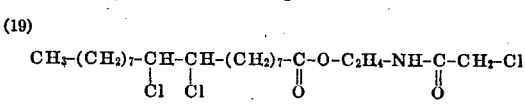

(20) 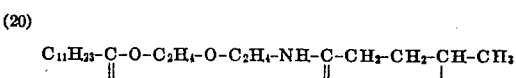

(21) 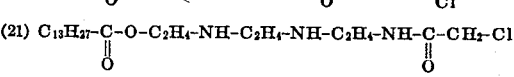

(22) 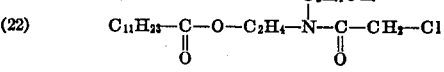

(23) 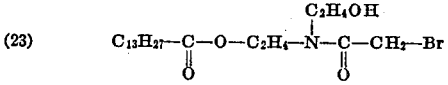

(24) 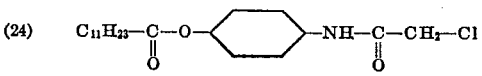

(25) 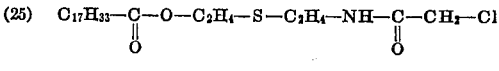

(Oleyl)

(26) 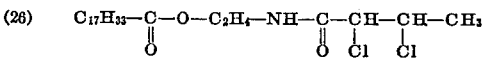

(Oleyl)

(27) 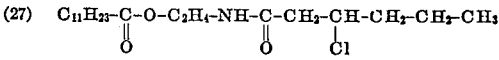

In general, the compounds are prepared by initially reacting an alcohol primary or secondary amine or alkylol primary or secondary amine, including corresponding polyamines, for example, monoethanolamine, with a halogen-carboxylic acid or derivative thereof under conditions such as to insure a substantial yield of amide. It has been found that if the halogen-carboxylic acid is employed in the form of an ester, for example, methyl chloracetate, and low temperatures are employed, of the order of about −10 degrees C. to about +10 degrees C., excellent yields of amide are obtained. The resulting amide is then reacted with a higher molecular weight organic acid or halide thereof to produce the ester. The process is preferably carried out in a non-aqueous medium, namely, one which is substantially devoid of water, this procedure producing the best yields and resulting in other advantages rendering the process more economical. By a non-aqueous medium is meant one where either the two reactants may be present or one of them may be in suspension in which latter case it may be regarded as a non-aqueous diluent. Again, an extraneous non-aqueous material such as methyl alcohol or ethyl alcohol may be added to the reaction mass to serve as a non-aqueous diluent.

It has been found that methyl alcohol esters of halogeno-acetic acid, for example, methyl chloracetate are decidedly superior to the corresponding ethyl esters for reaction with monoethanolamine or similar alkylol non-tertiary amines to produce the halogeno-acetamides of the monoethanolamine or the like. Furthermore, by operating at low temperatures of the character indicated hereinabove, that is, preferably not substantially exceeding +10 degrees C., the undesired alkylation of the monoethanolamine or the like is substantially avoided and far more complete amidification occurs with better yields of amide than is the case where the corresponding ethyl alcohol esters are used as starting material. It is accordingly to be understood that the employment of the methyl alcohol esters of the halogenoacetic acids, under the conditions enumerated, represents a distinctly preferred and important phase of the present invention.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will be evident to those skilled in the art in the light of the guiding principles which are disclosed herein.

*Example A*

(1) 122 grams of ethyl chloracetate were added slowly to a 25% aqueous solution containing 122 grams of monoethanolamine, the reaction being conducted at a temperature of 0 degrees C. to 10 degrees C. At the end of 15 minutes the reaction appeared to be complete. Approximately 126 grams of oxalic acid were then added to neutralize the excess of ethanolamine, maintaining preferably a temperature of 0 degrees C. to 10 degrees C. The water present in the reaction mixture was then evaporated off on the water bath and 1000 grams of iso-propyl alcohol were added. The mass was then filtered, the monoethanolamine oxalate being insoluble, and the alcohol was distilled off from the filtrate on a water bath under vacuum. (The excess monoethanolamine may be removed, if desired, in any other manner as, for example, by distillation under vacuum). The resulting product, consisting essentially of the N-beta-hydroxyethyl, chloracetamide, was a semi-viscous liquid.

(2) 14.8 grams of the N-beta-hydroxyethyl, chloracetamide, prepared as described in part (1) hereof, and 18.8 grams of lauroyl chloride were stirred vigorously while warming to 60 degrees C. over a period of 10 minutes. Approximately 5 minutes later, a vigorous reaction started with the evolution of hydrochloric acid. The resulting product, namely, the lauric acid ester of N-beta-hydroxyethyl, chloracetamide, was a solid, soft, waxy material.

*Example B*

(1) To 6.1 grams of monoethanolamine dissolved in 50 cc. of water and maintained in an ice bath there were added dropwise, with vigorous stirring, 21.6 grams of alpha-brom propionyl bromide. When approximately half of the latter had been added, the dropwise addition of 46.5 cc. of 2N NaOH was begun, the rest of the alpha-brom propionyl bromide being added dropwise meanwhile. The reaction was completed in 15 minutes and the mass was then evaporated on the water bath. It was then extracted with 500 cc. of boiling isopropyl alcohol and the mineral salts, such as sodium bromide, were filtered off. The alcohol was then evaporated and the reaction product, which was a viscous liquid, consisted essentially of a compound having the formula

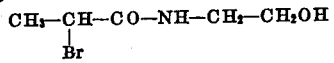

(2) 10 grams of the amide produced as described in part (1) hereof and 8 grams of lauroyl chloride were heated together at 50 degrees C. for approximately 5 minutes with vigorous stirring. When hydrochloric acid was no longer evolved, the reaction was terminated. The resulting compound was the lauric acid ester of the amide produced in part (1) hereof.

Example C 14 grams of the N-beta-hydroxyethyl, chloracetamide, produced as described in part (1) of Example A hereinabove, and 14 grams of caprylyl chloride were heated to 50 degrees C. and stirred vigorously for several minutes. The reaction was considered complete when no more hydrochloric acid was evolved. The resulting reaction product contained a substantial proportion of the caprylic acid ester of N-beta-hydroxyethyl, chloracetamide.

Example D (1) To 217 grams (2 mols) of methyl chloracetate 62 grams (1 mol) of monoethanolamine were added slowly with stirring, the temperature of the mixture being kept at approximately 0 degrees C. The addition of the monoethanolamine was made over a period of about 1¼ hours, a small amount of finely divided solid carbon dioxide being added to the reaction product to help maintain the temperature at about 0 degrees C. The reaction product was then subjected to a vacuum at a temperature of 20 degrees C. to 50 degrees C. and at an absolute pressure of 12 mm. to 70 mm. in order to remove the methyl alcohol which formed during the reaction, the carbon dioxide, and at least most of the excess methyl chlor acetate. Approximately 180 grams of a reaction product were obtained consisting essentially of the chloracetamide of monoethanolamine

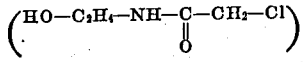

(2) To the reaction product of part (1) hereof, 330 grams of lauroyl chloride (approximately 63% pure, the balance comprising largely lauric acid) were added and the mass was heated, with stirring and under vacuum, for one hour at a temperature ranging from 60 degrees C. to 95 degrees C., in order to remove the hydrochloric acid which formed during the reaction. The reaction mass was then washed four times with tap water at 65 degrees C. until free of hydrochloric acid.

In the above example, it will be noted that the molal ratio of the methyl chlor acetate to the monoethanolamine was 2 to 1. Equal molal ratio may be employed but it is preferred, in order to obtain the best yields, to use an excess of methyl chlor acetate. In general, a molal ratio of methyl chlor acetate to monoethanolamine of about 1.5 to 1 to about 2 to 1 is preferred, the latter molal ratio representing close to the optimum operating conditions.

It should also be understood that the use of solid carbon dioxide may be omitted and, if desired, oxalic acid may be employed to precipitate excess monoethanolamine should the reaction be carried out in such a manner that excess monoethanolamine is present. This, however, does not represent the preferred embodiment of the invention.

Example E (1) 108.5 grams of methyl chlor acetate were dissolved in 327 grams of methyl alcohol and there were added thereto, slowly and with stirring, 74.4 grams of monoethanolamine. The reaction mixture was maintained at a temperature of about −10 degrees C. for approximately 1¼ hours. The temperature was then allowed to rise over a period of about 1 hour to +10 degrees C. at which stage the amidification reaction was approximately 98% complete. The slight excess of monoethanolamine was then removed by adding slowly, and with stirring, 17.32 grams of oxalic acid dissolved in 30 cc. of methyl alcohol. The precipitated oxalic acid salt of monoethanolamine was then filtered off and the methyl alcohol was evaporated off under vacuum from the filtrate. At room temperature, the reaction product was a viscous, pale straw to amber colored liquid and consisted essentially of the chloracetamide of monoethanolamine.

(2) 124 grams of the reaction product of part (1) hereof were mixed with 176.5 grams of 90% pure lauroyl chloride and the mixture was heated, with stirring and under vacuum, for 1 hour at about 70 degrees C. until no more hydrochloric acid was driven off. The reaction mass was then washed twice, each time with 4 liters of water at 60 degrees C. until the wash water was free of hydrochloric acid.

In the above Example E, it will be noted that methyl alcohol is used as a diluent, the monoethanolamine is employed in slight excess and the excess thereof is removed by precipitation with oxalic acid.

Example F (1) To 1085 grams of methyl chloracetate, maintained at about 0 degrees C., there were added, slowly and with stirring over a period of about 10 minutes, 525 grams of diethanolamine also maintained at a temperature of about 0 degrees C. The temperature rose to about +10 degrees C. and the reaction mass was then allowed to stand whereupon the temperature rose to 24 degrees C. The reaction mass was then allowed to stand at approximately this temperature for twelve hours. The methyl alcohol which formed during the reaction and the excess methyl chloracetate were distilled off in vacuo at a temperature of about 60 degrees C. The reaction product contained a substantial proportion of the chloracetamide of diethanolamine.

(2) To 94 grams of the reaction product of part (1) hereto there were added dropwise and with stirring 99 grams of lauroyl chloride, the addition being made over a period of about 20 minutes and while maintaining the reaction mass at a temperature ranging from 80 degrees C. to 100 degrees C. The final reaction product was a clear, light amber, semi-viscous material containing a substantial proportion of a compound having the following formula:

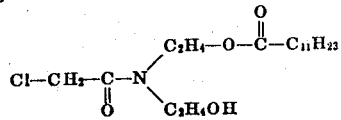

It will be understood that the novel compounds of the present invention, set forth in the list hereinabove, may be produced in accordance with the processes described or other processes which will be apparent to those skilled in the art in the light of my teachings herein. In the preparation of specific compounds, it will, of course, be appreciated that variations in proportions of the reactants, changes in temperature, and the like, may be advisable or necessary. However, such factors are well understood by those versed in the art and require no elaboration.

It will be understood, particularly in the light of the examples hereinabove, that the novel compounds of the present invention may contain one or more imino or like linkages. Thus, for example, in place of employing monoethanolamine or monopropanolamine or the like as a starting material, compounds may be utilized having a plurality of imino groups such as the following, by way of illustration:

(a) HO—CH$_2$—CH$_2$—NH—CH$_2$—
    CH$_2$—NH—CH$_2$—CH$_2$—NH$_2$ (b) HO—CH$_2$—CH$_2$—CH$_2$—NH—CH$_2$—
    CH$_2$—CH$_2$—NH—CH$_2$—CH$_2$—CH$_2$—NH$_2$ (c) 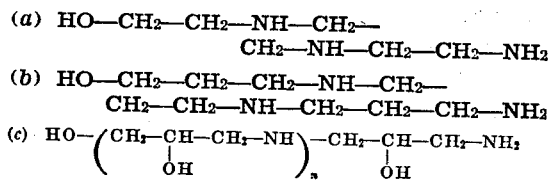

The organic radical represented by R in the general formulae may, as stated, be derived from various sources. Among such sources may be mentioned straight chain and branched chain carboxylic, aliphatic, and fatty acids, saturated and unsaturated, such as butyric acid, caprylic acid, caproic acid, capric acid, sebacic acid, behenic acid, arachidic acid, cerotic acid, erucic acid, melissic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicylic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

The halogeno-carboxylic acids which, in the form of their esters, particularly with methyl alcohol, are reacted with the alcohol primary and secondary amines or alkylol primary and secondary amines may be selected from a relatively large class including mono-, di-, and polycarboxylic derivatives as, for example, mono chloracetic acid, mono bromacetic acid, mono iodo acetic acid, alpha-chlor propionic acid, alpha-brom propionic acid, alpha-chlor butyric acid, alpha-bromo capric acid, mono chlor succinic acid, di-chlor succinic acid, di chlor glutaric acid, and the like. Of special utility, as previously indicated, are methyl alcohol esters of the halogeno acetic acids, particularly, methyl chlor acetate.

The alcohols whose halogeno-carboxylic esters are reacted with the alcohol primary and secondary amines are preferably of lower molecular weight, especially the volatile alcohols, namely, methyl alcohol and ethyl alcohol, being preferred with the methyl alcohol being especially desirable when utilized under the conditions described hereinabove. It will be understood that the reactivity of the alcohol esters of the halogeno-carboxylic acids in connection with the formation of the amides therefrom with monoethanolamine or the like is dependent upon the alcohol portion of the ester molecule as well as upon the halogeno-carboxylic acid with which it is esterified. In general, the higher in the homologous series of the alcohol and the halogeno-carboxylic acid, the less reactive are the materials.

The alcohol primary and secondary amines or alkylol primary and secondary amines, in other words, the alcohol non-tertiary amines and alkylol non-teritary amines, which are reacted with methyl chlor acetate or the like to produce the halogen-containing amides include, among others, by way of example, monoethanolamine, diethanolamine, monopropanolamine, di-propanolamine, monobutanolamine, ethyl monoethanolamine, the mono ethyl ether of diethanolamine, mono-cyclohexyl, beta-hydroxy-ethyl amine; monobutyl, beta-hydroxyethyl amine; ethanol aniline; 1-amino-propanediol-2, 3; glycerol and other polyhydric alcohol and sugar or sugar alcohol primary and secondary amines such as glycerol mono amine, sorbitol mono amine, mannitol mono amine, and the like. As indicated hereinabove, monoethanolamine is especially satisfactory in carrying out the novel processes of the present invention.

Wherever the term "higher" is employed as referring to higher molecular weight organic or fatty acids or the like, it will be understood to cover compounds or radicals having at least six carbon atoms, unless otherwise specifically stated.

The present application is a continuation-in-part of my prior application Serial No. 219,358, filed July 15, 1938, now Patent No. 2,184,770, issued December 26, 1939.

What I claim as new and desire to protect by Letters Patent of the United States is:

1. Chemical compounds corresponding to the general formula

RO—(alk—NY)$_m$—CO—Z(X)$_w$ wherein R is an organic radical containing at least four carbon atoms, alk and Z are each members selected from the class consisting of hydrocarbon radicals and substitution products thereof, Y is a member selected from the group consisting of hydrogen, alkyl, cycloalkyl, alkoxyl, aralkyl, aryl, and alkylol, $m$ and $w$ are whole numbers, and X is halogen.

2. Chemical compounds corresponding to the general formula

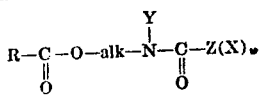

wherein

is an aliphatic acyl radical containing at least eight carbon atoms, alk is a hydrocarbon radical, Y is a member selected from the group consisting of hydrogen, alkyl, cycloalkyl, alkoxyl, aralkyl, aryl, and alkylol, Z is a hydrocarbon residue, X is halogen, and $w$ is a whole number.

3. Chemical compounds corresponding to the general formula

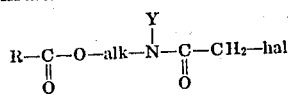

wherein

is an aliphatic acyl radical containing at least eight carbon atoms, alk is alkylene, Y is a member selected from the group consisting of hydrogen, alkyl, cycloalkyl, alkoxyl, aralkyl, aryl, and alkylol, and hal is halogen.

4. Chemical compounds corresponding to the general formula $$RO-(alk-NY)_m-CO-ZX$$

wherein R is an organic radical containing at least four carbon atoms, alk is hydrocarbon, Y is a member selected from the group consisting of hydrogen, alkyl, cycloalkyl, alkoxyl, aralkyl, aryl, and alkylol, $m$ is a whole number, Z is a hydrocarbon residue, and X is halogen.

5. Chemical compounds corresponding to the general formula

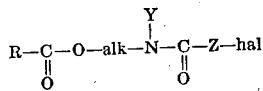

wherein

is an aliphatic acyl radical containing at least eight carbon atoms, alk is hydrocarbon, Y is a member selected from the group consisting of hydrogen, alkyl, cycloalkyl, alkylol, alkoxyl, aralkyl, and aryl, Z is a hydrocarbon residue, and hal is halogen.

6. Chemical compounds corresponding to the general formula

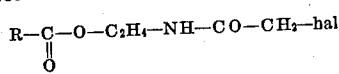

wherein

is an acyl radical containing at least four carbon atoms, and hal is halogen.

7. Chemical compounds corresponding to the general formula

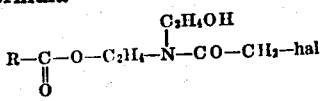

wherein

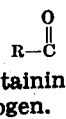

is an acyl radical containing at least four carbon atoms, and hal is halogen.

8. Chemical compounds corresponding to the general formula

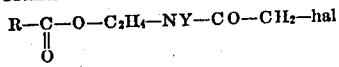

wherein

is a fatty acid acyl radical containing from eight to eighteen carbon atoms, Y is a member selected from the group consisting of hydrogen, alkyl, cycloalkyl, alkoxyl, aralkyl, aryl, and alkylol, and hal is halogen.

9. Chemical compounds corresponding to the general formula

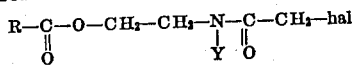

wherein

is an aliphatic acyl radical containing at least eight carbon atoms, Y is a member selected from the group consisting of hydrogen, alkyl, cycloalkyl, alkoxyl, aralkyl, aryl, and alkylol, and hal is halogen.

10. Chemical compounds corresponding to the formula

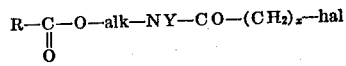

wherein

is an alaphatic acyl radical containing at least eight carbon atoms, alk is a member selected from the class consisting of alkylene and substitution products thereof, Y is a member selected from the group consisting of hydrogen, alkyl, cycloalkyl, alkoxyl, aralkyl, aryl, and alkylol, hal is halogen, and $x$ is a number ranging from one to four.

11. Chemical compounds corresponding to the formula

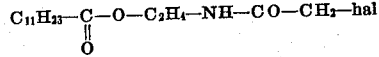

wherein hal is a member of the group consisting of chlorine, bromine and iodine.

12. The process of preparing chemical compounds which comprises reacting a halogenocarboxylic acid amide of an alcohol amine with a member selected from the group consisting of carboxylic acids and halides thereof containing at least four carbon atoms to form an ester linkage.

13. The process of preparing chemical compounds which comprises reacting N-beta-hydroxy-ethyl, chloracetamide with an acyl halide containing from eight to eighteen carbon atoms to form an ester linkage.

14. The process of preparing chemical compounds which comprises reacting the methyl ester of chloracetic acid with monoethanolamine at temperatures of about 0 degrees C. to 10 degrees C. to produce essentially N-beta-hydroxyethyl, chloracetamide, then reacting said amide with lauroyl chloride to produce the lauric acid ester of said amide.

15. The method of preparing chemical compounds which comprises reacting a methyl alcohol ester of a member selected from the group consisting of chloracetic acid, bromacetic acid, and iodo acetic acid, with an alkylol non-tertiary amine, to form an amide, and then introducing a fatty acid acyl radical containing at least four carbon atoms.

16. The method of claim 15 wherein the alkylol non-tertiary amine comprises a member of the group consisting of monoethanolamine, diethanolamine, and mixtures thereof.

17. The method of preparing chemical compounds which comprises reacting a volatile alcohol ester of a halogeno-carboxylic acid with an alcohol non-tertiary amine to form an amide, and then introducing into the amide an acyl radical containing at least four carbon atoms.

18. The method of preparing chemical compounds which comprises reacting a methyl alcohol ester of a member selected from the group consisting of chloracetic acid, bromacetic acid and iodo acetic acid, with an alkylol non-tertiary amine to form an amide, said reaction being carried out at a temperature of the order of 0 degrees C. to 10 degrees C., and then introducing into said amide a fatty acid acyl radical containing from eight to eighteen carbon atoms.

19. The method of claim 18 wherein the alkylol non-tertiary amine comprises a member of the group consisting of monoethanolamine, diethanolamine and mixtures thereof.

20. The method of preparing chemical compounds which comprises reacting a volatile alcohol ester of a member selected from the group consisting of chloracetic acid, bromacetic acid and iodo acetic acid, with monoethanolamine at a temperature not above about 10 degrees C. to form an amide of the monoethanolamine, precipitating the excess monoethanolamine with oxalic acid, filtering to remove the precipitate of monoethanolamine oxalate, distilling the filtrate to remove alcohol formed in the amidification reaction, and reacting the residue with an acyl halide of a fatty acid containing from eight to eighteen carbon atoms to form an ester.

MORRIS B. KATZMAN.